US012593298B2

(12) United States Patent
Hou

(10) Patent No.: US 12,593,298 B2
(45) Date of Patent: Mar. 31, 2026

(54) METHOD OF ESTIMATING A GEOGRAPHIC LOCATION OF A MOBILE DEVICE

(71) Applicant: Vodafone Group Services Limited, Newbury (GB)

(72) Inventor: Jindong Hou, Newbury (GB)

(73) Assignee: Vodafone Group Services Limited, Newbury (GB)

( * ) Notice: Subject to any disclaimer, the term of this patent is extended or adjusted under 35 U.S.C. 154(b) by 552 days.

(21) Appl. No.: 18/004,526

(22) PCT Filed: Jul. 2, 2021

(86) PCT No.: PCT/EP2021/068384
§ 371 (c)(1),
(2) Date: Jan. 6, 2023

(87) PCT Pub. No.: WO2022/008384
PCT Pub. Date: Jan. 13, 2022

(65) Prior Publication Data
US 2023/0247579 A1 Aug. 3, 2023

(30) Foreign Application Priority Data
Jul. 8, 2020 (GB) ..................................... 2010503

(51) Int. Cl.
*H04W 64/00* (2009.01)
*G01S 5/00* (2006.01)
*G01S 5/02* (2010.01)
(52) U.S. Cl.
CPC ........... *H04W 64/00* (2013.01); *G01S 5/0027* (2013.01); *G01S 5/0036* (2013.01); *G01S 5/02526* (2020.05)
(58) Field of Classification Search
CPC ....... H04W 4/02; H04W 48/18; H04W 64/00; G01S 5/0027; G01S 5/0036
See application file for complete search history.

(56) References Cited

U.S. PATENT DOCUMENTS 8,600,401 B2 12/2013 Kumar
2011/0117917 A1 5/2011 Gresset et al.
(Continued)

FOREIGN PATENT DOCUMENTS

CN 102076034 A 5/2011
EP 3462646 A1 4/2019

OTHER PUBLICATIONS

International Search Report & Written Opinion for application No. PCT/EP2021/068384 mailed on Oct. 19, 2021.
(Continued)

*Primary Examiner* — Sam Bhattacharya
(74) *Attorney, Agent, or Firm* — Workman Nydegger

(57) ABSTRACT

A method of estimating a geographic location of a mobile device configured to communicate using a telecommunications network comprising a plurality of cells is provided. The method comprises obtaining one or more data records from the mobile device, wherein each data record comprises a plurality of signal measurements and respective cell identifiers, wherein each signal measurement relates to a signal received by the mobile device from a cell of the plurality of cells attributed with the respective cell identifier. The method further comprises, for each data record, generating an ordered list of signal properties comprising the plurality of signal measurements, wherein each signal property in the ordered list of signal properties is correlated with a corresponding cell identifier assigned to the cell from which the signal was received, based on an index of the signal property in the ordered list of signal properties. The method further comprises, for each data record, estimating the geographic location of the mobile device based on the ordered list of signal properties.

17 Claims, 8 Drawing Sheets

(56)        References Cited

U.S. PATENT DOCUMENTS

| | | |
|---|---|---|
| 2011/0176523 A1 | 7/2011 | Huang et al. |
| 2014/0106773 A1 | 4/2014 | Li |
| 2019/0053189 A1 | 2/2019 | Ramamurthy |
| 2019/0306675 A1 | 10/2019 | Xue |

OTHER PUBLICATIONS

Office Action received for Chinese Patent Application No. 202180055108.9, mailed on May 22, 2025, 19 pages (10 pages of English Translation and 9 pages of Original Document).

Figure 4:
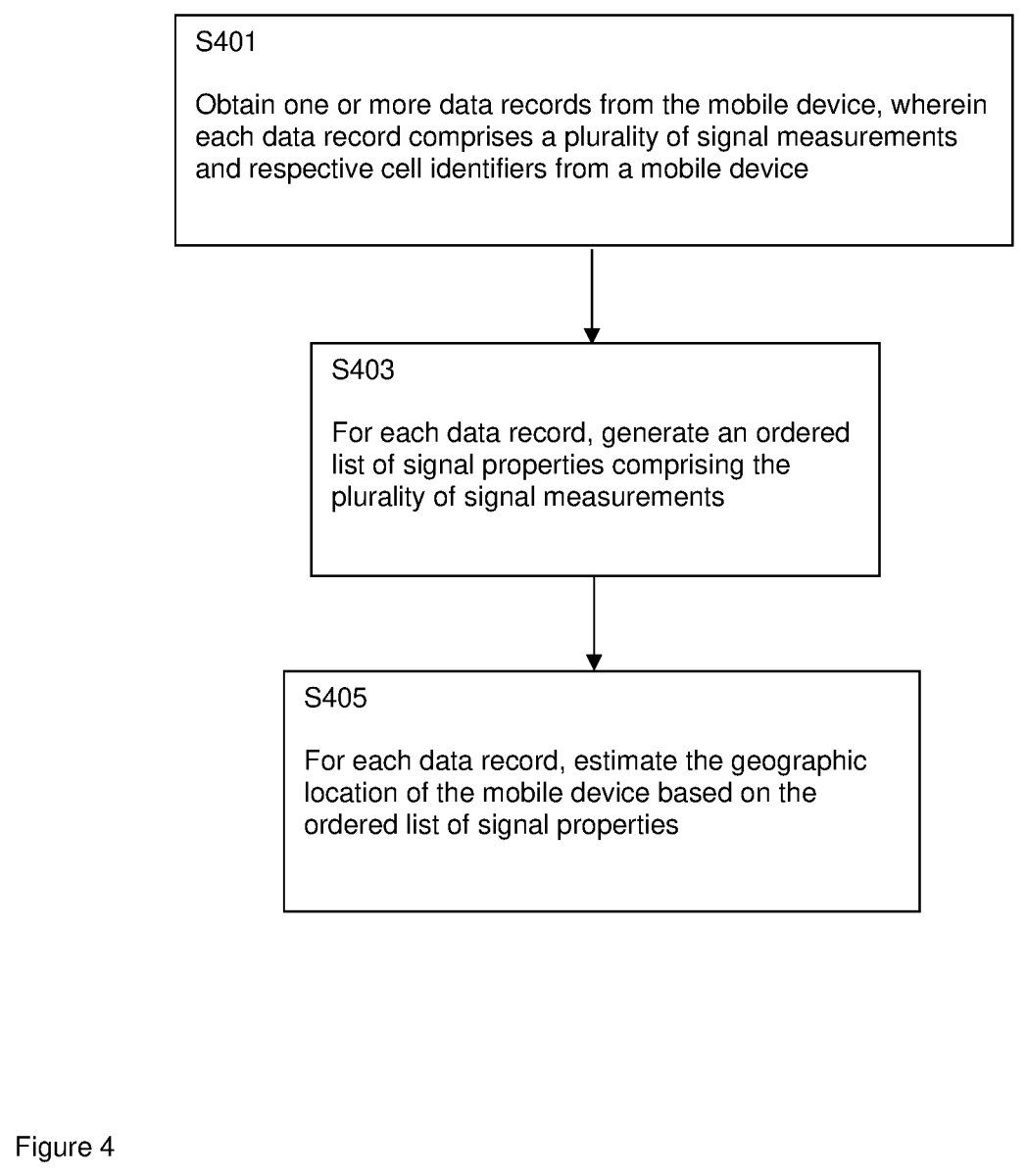

S401

Obtain one or more data records from the mobile device, wherein each data record comprises a plurality of signal measurements and respective cell identifiers from a mobile device

S403

For each data record, generate an ordered list of signal properties comprising the plurality of signal measurements

S405

For each data record, estimate the geographic location of the mobile device based on the ordered list of signal properties

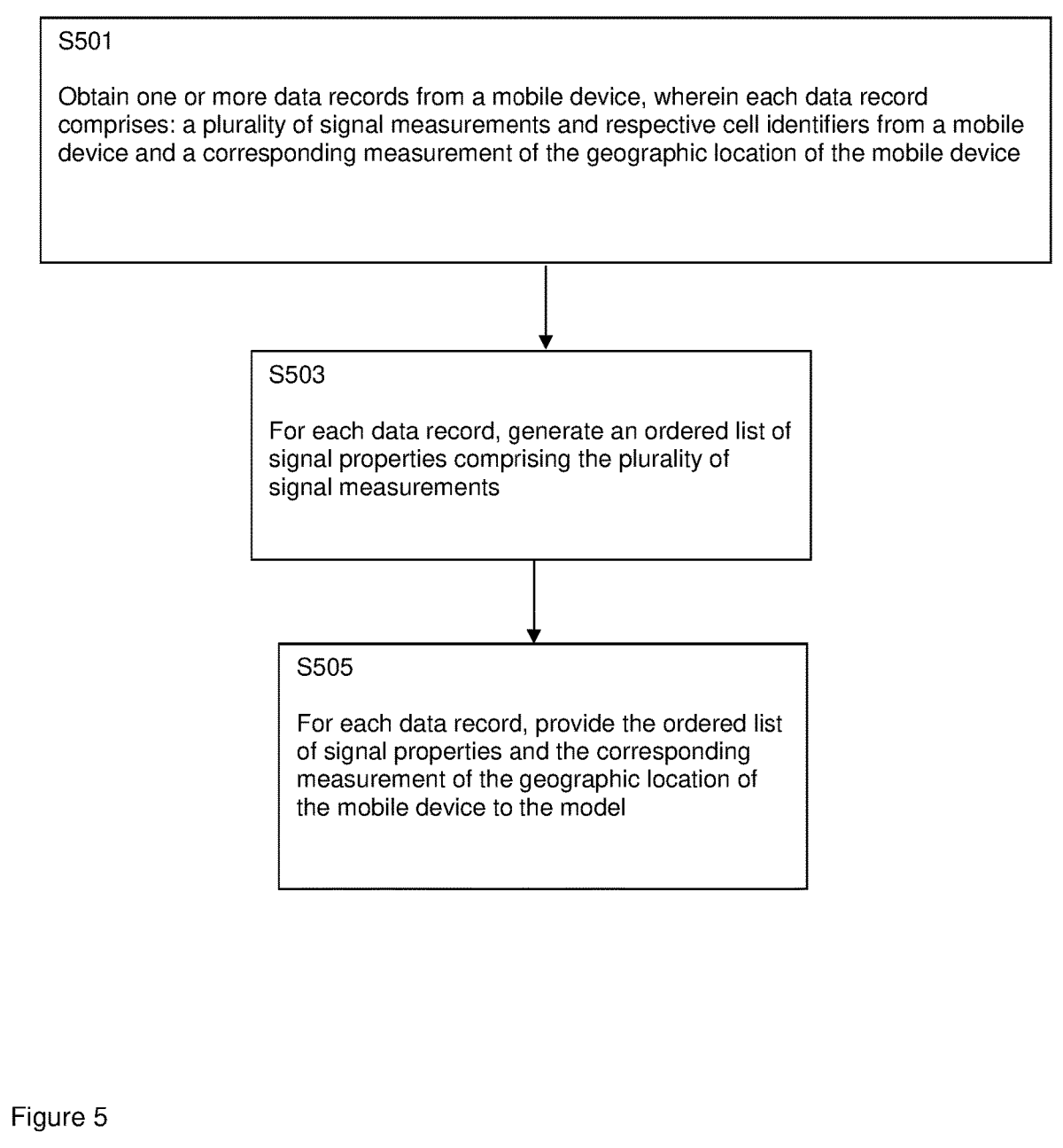

Obtain one or more data records from a mobile device, wherein each data record comprises: a plurality of signal measurements and respective cell identifiers from a mobile device and a corresponding measurement of the geographic location of the mobile device

S503

For each data record, generate an ordered list of signal properties comprising the plurality of signal measurements

S505

For each data record, provide the ordered list of signal properties and the corresponding measurement of the geographic location of the mobile device to the model

Figure 5

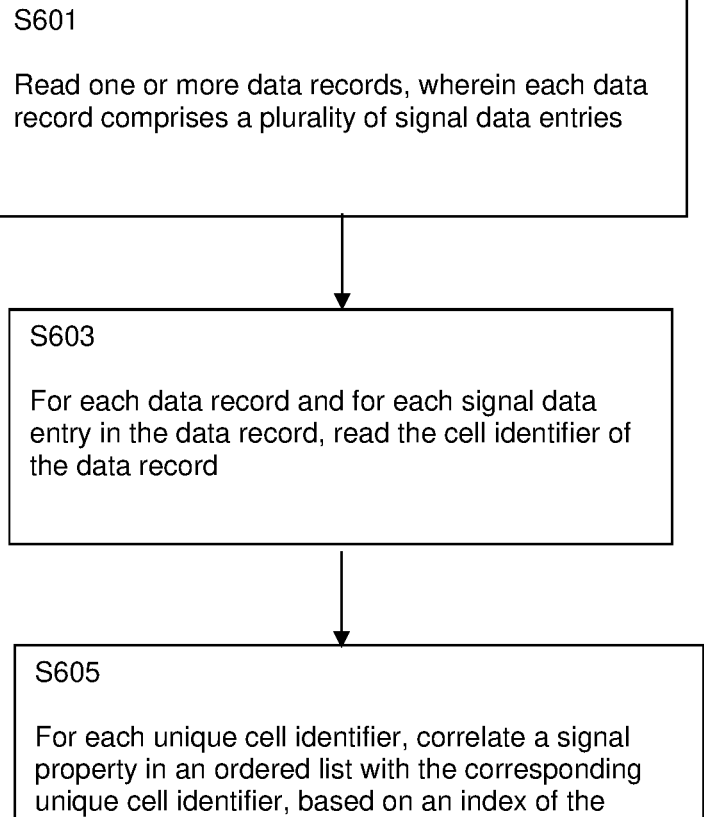

S601

Read one or more data records, wherein each data record comprises a plurality of signal data entries

S603

For each data record and for each signal data entry in the data record, read the cell identifier of the data record

S605

For each unique cell identifier, correlate a signal property in an ordered list with the corresponding unique cell identifier, based on an index of the signal property in the ordered list

Read a data record comprising a plurality of signal data entries

S703

For each signal data entry in the data record, populate a signal property in the ordered list of signal properties with the signal measurement of the signal data entry

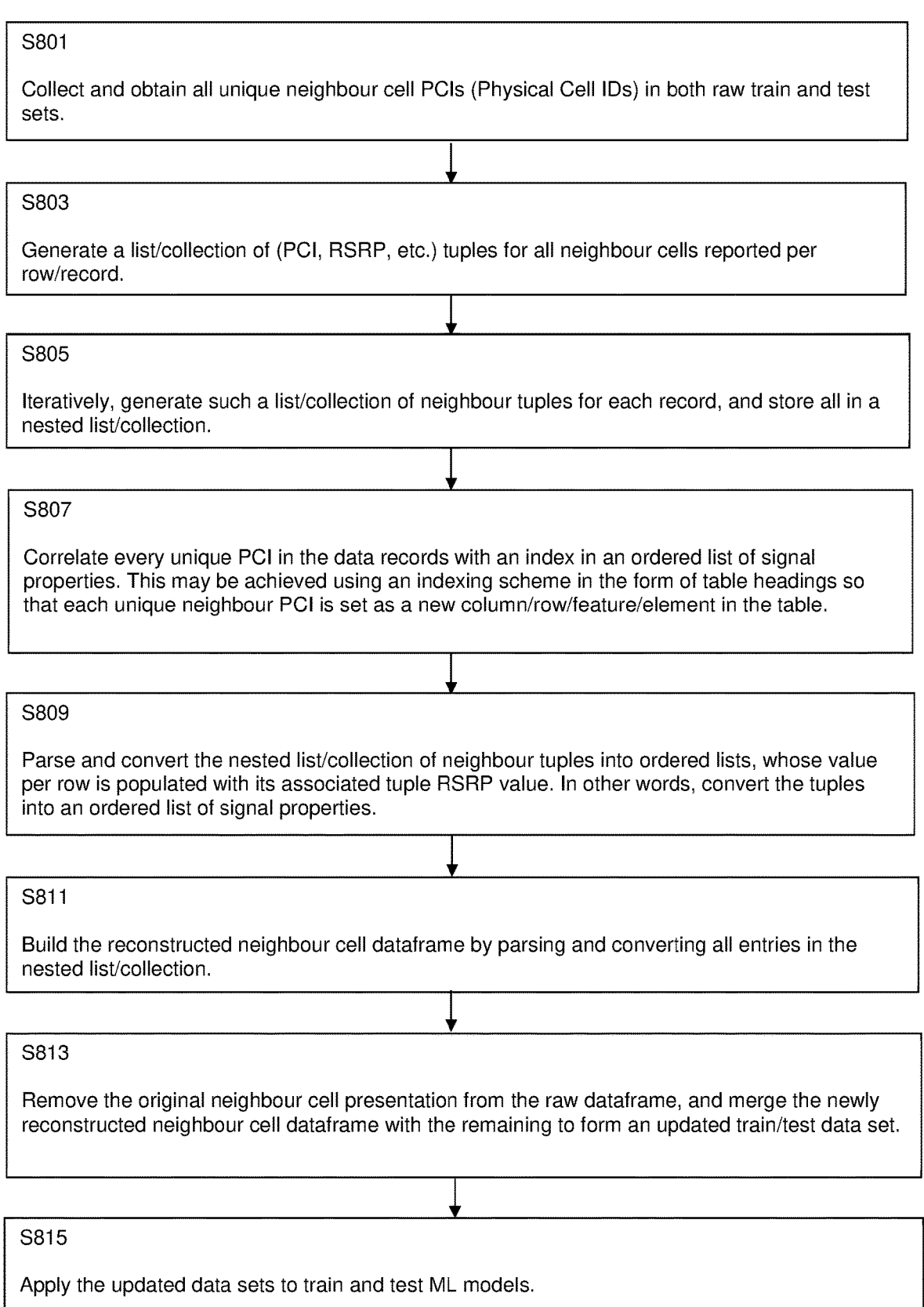

S801

Collect and obtain all unique neighbour cell PCIs (Physical Cell IDs) in both raw train and test sets.

S803

Generate a list/collection of (PCI, RSRP, etc.) tuples for all neighbour cells reported per row/record.

S805

Iteratively, generate such a list/collection of neighbour tuples for each record, and store all in a nested list/collection.

S807

Correlate every unique PCI in the data records with an index in an ordered list of signal properties. This may be achieved using an indexing scheme in the form of table headings so that each unique neighbour PCI is set as a new column/row/feature/element in the table.

S809

Parse and convert the nested list/collection of neighbour tuples into ordered lists, whose value per row is populated with its associated tuple RSRP value. In other words, convert the tuples into an ordered list of signal properties.

S811

Build the reconstructed neighbour cell dataframe by parsing and converting all entries in the nested list/collection.

S813

Remove the original neighbour cell presentation from the raw dataframe, and merge the newly reconstructed neighbour cell dataframe with the remaining to form an updated train/test data set.

S815

Apply the updated data sets to train and test ML models.

Figure 8

METHOD OF ESTIMATING A GEOGRAPHIC LOCATION OF A MOBILE DEVICE

CROSS-REFERENCE TO RELATED APPLICATIONS

The present invention is a 35 U.S.C. § 371 U.S. National Stage of PCT Application No. PCT/EP2021/068384, filed on Feb. 7, 2021, which claims priority to GB 2010503.7, filed on Aug. 7, 2020. The entire content of each of the afore-mentioned patent applications is incorporated herein by reference.

TECHNICAL FIELD

This application relates to estimation of geographic loca-tions of mobile devices. This application further relates to training models for estimating geographic locations of mobile devices. This application further relates to data processing for these methods and systems, electromagnetic signals, computer software and computer readable media relating to these methods.

BACKGROUND

Estimating the current geographic location of a mobile device (localization of a mobile device) may be required for a number of reasons. Possible motivations include providing navigation instructions or remotely tracking the location of vehicles. If a device needs to know its own location (e.g. for navigation) then it may use a global navigation satellite system (GNSS). If another entity in the network needs to know the location of the mobile device (e.g. for monitoring traffic conditions or tracking specific devices) then this may be more challenging. This is because it may not be possible to induce the mobile devices to transmit GPS information to other network entities.

This application is concerned with mobile devices that are configured to communicate using a telecommunications network. These may include user-operated mobile devices such as smartphones and may also include Machine to Machine (M2M) devices or other connected devices in the Internet of Things (IoT).

Existing localisation techniques may be performed using information about the serving cell of the mobile device. Basic techniques for localization of mobile devices simply report the centroid of the serving cell of the cellular network (or the physical location of the serving base station). How-ever, such techniques only provide a rough location of a device with limited accuracy. This accuracy may be insuf-ficient for some applications.

Other techniques obtain an estimate of the location of the mobile device through the use of "fingerprinting". This technique compares the network conditions for the serving cell to a database of network conditions for that cell at various locations. The network conditions may include Cell Identification (Cell ID), Received Signal Strength (RSS), Angle of Arrival (AoA), Time of Arrival (ToA) and Time Difference of Arrival (TDoA). Fingerprints may require a large effort to collect and may only be valid for a finite timeframe, due to changing conditions in the network.

Radio Positioning System (RPS) is a radio Fingerprint Geolocation solution that determines a real-time location of a mobile handset using Mobile Radio Network information. RPS may be used to predict a mobile terminal's location. However, these techniques rely on spotting similarities between reported data from the mobile device with training data. The reported data and the training data are fairly complex and spotting similarities can be a difficult and time consuming operation for a model or machine learning data processing component. As a result, the accuracy of the location estimation may be insufficient for some purposes.

Moreover, RPS is ineffective at estimating the location of certain categories of mobile devices. This may be because the radio conditions are different for particular groups of mobile devices. For example, flying mobile devices such as drones have distinct radio characteristics that result in inac-curate estimation when using standard RPS.

Another prior art method is "data normalisation" or "feature scaling", which attempts to normalise the ranges of the features in the MR for the models. Whilst these methods may be useful for eliminating scaling mismatches between the reported data and the training data, this alternative fails to sufficiently address the problems that exist with prior art techniques such as RPS.

It is an object of the present invention to overcome these issues.

SUMMARY

This application provides an improved method of esti-mating a geographic location of a mobile device. This application further provides an improved method of provid-ing training data to a model, a method of generating an ordered list of signal properties and a method of correlating signal properties in an ordered list to corresponding cell identifiers. A novel method is proposed to reformat and reconstruct the neighbour cell information to dramatically improve input data quality to allow the Machine Learning (ML) models to better learn patterns. By reconstructing Measurement Reports that provide neighbour cell informa-tion in an uncertain order and instead providing signal data (e.g. signal strength data) in an ordered list of signal prop-erties in which the indexes of the signal properties correlate with corresponding cell identifiers, the present invention may improve geo-location estimation model accuracy and performance.

Prior art methods rely on artificial intelligence to make a correlation between signal strength measurements and an identifier of each neighbour cell in the measurement record. In contrast, using methods described in this application, the model is able to directly correlate the signal measurements with the cell identifiers using the indexes of the signal measurements in the ordered list. As a result, the accuracy of the geographic location estimated by the model may be improved. Moreover, the inputs to the model comprise signal measurements that are ordered more consistently compared to prior art methods that use Measurement Records (MRs). The model may easily relate the signal measurements to cell identifiers and therefore operate more efficiently, as well as more effectively.

The methods described in this application are of particular relevance to estimating the geo-location of unmanned aerial vehicles (drones). By applying the proposed method to drone RPS data, ML models may be build that exceed the performance of prior art solutions.

A method of estimating a geographic location of a mobile device, wherein the mobile device is configured to commu-nicate using a telecommunications network comprising a plurality of cells, is provided. The method comprises obtain-ing one or more data records from the mobile device, wherein each data record comprises a plurality of signal measurements and respective cell identifiers. Each signal measurement relates to a signal received by the mobile device from a cell of the plurality of cells attributed with the respective cell identifier. The method further comprises, for each data record, generating an ordered list (e.g. an array or vector) of signal properties comprising the plurality of signal measurements. Each signal property in the ordered list of signal properties is correlated with a corresponding cell identifier assigned to the cell from which the signal was received, based on an index of the signal property in the ordered list of signal properties. In other words, each signal measurement of the plurality of signal measurements appears in the ordered list at a position having an index corresponding to the respective cell identifier of the signal measurement. The method further comprises estimating the geographic location of the mobile device based on the ordered list of signal properties.

By using a list of signal measurements that is ordered according to the cell identifiers of the received signals, an model (e.g. a machine learning model) using the above method is able to more accurately estimate the geographic location of the mobile device.

The mobile device may receive signals from only a subset of the plurality of cells. Each signal may be encoded with the respective cell identifier assigned to the cell from which the signal was received. For each of the plurality of received signals, the mobile device may determine one or more signal measurements for the signal (in other words, the mobile device may measure one or more properties of the signal; for example, the mobile device may determine a signal strength measurement by measuring the received power of the signal and/or a signal quality measurement). The plurality of signal measurements obtained from the mobile device may relate to signals received from different cells at the mobile device at a concurrent moment in time.

Characteristics of a received signal determined directly by measuring that received signal may be referred to as signal "measurements". Where a list contains measurements and also contains numbers indicating that no signal has been received, the elements of this list may be referred to as signal "properties".

Advantageously, the ordering of signal properties within the ordered list of signal properties is always the same. As a result, the ordered list of signal properties comprises signal measurements that are correlated with corresponding cell identifiers, based on an index of the signal property in the ordered list of signal properties. As a result the model may operate more efficiently because there is no need to correlate measurements with cell identifiers. Moreover, the model may not require knowledge of the ordering. The model may not need to directly correlate cell identifiers with signal properties because it may be sufficient to know that signal properties in the same position in their respective ordered list relate to the same cell identifier.

Prior art methods may use lists of signal strength measurements that are subject to inconsistent ordering. As an example, a first record of signal strength properties at a first time may contain signal strength measurements from six neighbouring cells. A signal strength measurement of a signal received from a cell allocated cell identifier 123 may appear at position 1 in the list of signal strength properties in the first record. Subsequently, a second record of signal strength properties at a second time may contain signal strength measurements from the same six cells, including a signal received from the cell allocated cell identifier 123. However, the signal strength measurement of the signal received from this cell may appear at position 2 in the list of signal strength properties in the second record. This inconsistency may cause inaccuracies or inefficiencies in prior art estimation methods. The above methods may address such issues with the prior art.

The one or more data records may comprise a first data record corresponding to a first time and a second data record corresponding to a second time different to the first time.

Each data record may further comprise an identifier linked to the mobile device. The method may further comprise using the identifiers from the first and second data records to determine that the first and second data records have been obtained from the same mobile device.

This may be achieved by determining that the first and second identifiers are the same.

For the second data record, estimating the geographic location of the mobile device may be further based on the estimated geographic location of the mobile device for the first data record.

By identifying that signal measurements from different measurement records relate to the same mobile device, the model may use previous estimations of the mobile device's location to determine an updated estimate of the location of the mobile device. The model may use maximum a posteriori "MAP" techniques. This may improve accuracy of the estimation of the geographic location.

A method of providing training data to a model (e.g. a classifier, support vector machine, neural network, or other machine learning component) for estimating a geographic location of a mobile device based on a plurality of signal measurements is provided. The method comprises obtaining one or more data records from a mobile device (a training mobile device which may be different to the mobile device whose location the model is for estimating). Each data record comprises a plurality of signal measurements and respective cell identifiers from a mobile device, along with a corresponding measurement of the geographic location of the mobile device. The mobile device is configured to communicate using a telecommunications network comprising a plurality of cells. Each signal measurement relates to (indicates a received signal power of) a signal received by the mobile device from a cell of the plurality of cells attributed with the respective cell identifier. The method further comprises, for each data record, generating an ordered list (e.g. array or vector) of signal properties comprising the plurality of signal measurements. An index of each signal property in the ordered list of signal properties is correlated with a corresponding cell identifier assigned to the cell from which the signal was received, based on an index of the signal property in the ordered list of signal properties. In other words, each signal measurement of the plurality of signal measurements appears in the ordered list at a position having an index corresponding to the respective cell identifier of the signal measurement. The method further comprises, for each data record, providing the ordered list of signal properties and the corresponding measurement of the geographic location of the mobile device to the model.

Advantageously, if the model is trained using signal properties that are provided in a predefined order, the model may be able to more easily identify relationships between the location data and the signal measurement data. As a result, the model may be able to estimate a geographic location based on signal measurement data more accurately. This is especially important where the model is a machine learning model. The accuracy of geographic location estimated using machine learning models is greatly improved by structuring the signal data using these techniques. This improvement in accuracy would not have been expected by the skilled person, who would expect that the structure of the data itself would not affect the outcome of the ML model.

The mobile device may be a first mobile device. The ordered list may be a first ordered list. The model may be configured to receive as an input a second ordered list of signal properties obtained from a second mobile device configured to communicate using the telecommunications network. An index of each signal property in the ordered list of signal properties from the second device may be correlated with a corresponding cell identifier assigned to the cell from which the signal was received, based on an index of the signal property in the ordered list of signal properties. The model may be configured to provide as an output an estimation of a geographic location of the second mobile device.

The second ordered list may be received indirectly from the second mobile device. This may be because data obtained directly from the mobile device may contain signal measurements that are not ordered according to their corresponding cell identifiers. A data processor may receive the signal measurements and corresponding cell identifiers from the mobile device, process the data, and provide the second ordered list to the model.

The first and second ordered lists of signal properties may be ordered so that signal measurements in each of the respective ordered lists having the same index correspond to the same cell identifier.

Advantageously, the ordering of signal properties within each of the first and second ordered lists of signal properties is the same. In this way, the first ordered list of signal properties and the second ordered list of signal properties each comprise signal measurements that are correlated with corresponding cell identifiers, based on an index of the signal property in the respective ordered list of signal properties. As a result the model may operate more efficiently because there is no need to correlate measurements with cell identifiers. The model may not need to directly correlate cell identifiers with signal properties because it may be sufficient to know that signal properties in the same position in their respective ordered list relate to the same cell identifier.

The accuracy of the model may be improved by providing training data that includes ordered lists of signal vales, where the positions of the properties in the list relating to the same cell identifier are the same as the positions of signal properties in the data provided to the model for estimation of geographic location of the mobile device (test data).

Generating the ordered list of signal properties may comprise, for each signal property in the ordered list having an index corresponding to a cell identifier for which a respective signal measurement has not been obtained, assigning a value to the signal property in the ordered list indicating that no signal has been received by the mobile device.

In other words, for each signal property in the ordered list corresponding to a cell identifier that is not assigned to any of the cells from which a signal has been received by the mobile device (and therefore from which no signal measurement has been obtained), a "null" value is assigned to that property in the ordered list. In this way, the ordered list of signal properties comprises a signal property for every unique cell identifier-non-null values where measurements have been obtained and null values where no measurements have been obtained.

A "null" value may be a value of 0 or may be another value indicating that no signal has been received (e.g. 999 or −999).

Preferably, it should not be possible for a mobile device to receive signals from different cells that are assigned the same cell identifier. However, in theory, if this were to happen then the signal property in the ordered list corresponding to that cell identifier could be populated with the signal measurement relating to the strongest signal or signal with the highest quality.

The mobile device may be capable of communicating over mobile networks according to any defined mobile standard, for example, 2G, 3G, 4G, 5G or any other. The mobile device may be a UE or may be a device that comprises a UE to provide connectivity to a mobile network. The mobile device may be an aerial vehicle. The mobile device may be an unmanned aerial vehicle (UAV or "drone"). The mobile device may be a user equipment aboard an unmanned or manned aerial vehicle (e.g. a user equipment in the pocket of a pilot/passenger of an aeroplane, microlight hang glider, parasail, jetpack, passenger balloon, airship etc.). The mobile device may be an airborne device (e.g. a UE mounted to a flying animal or weather balloon).

Drones and other airborne devices operate at higher altitudes than standard handheld mobile devices, which tend to be at ground level during normal operation. As a result, signals received at airborne mobile devices may experience different signal properties (e.g. signal strengths and qualities) to those received at the same latitude and longitude at ground level. This may be because there are fewer obstructions to the signals at higher altitudes (e.g. buildings). There may also be fewer sources of interference (such as generators). Moreover, depending on the altitude of the drone, signal strengths may be lower than at ground level because of the distance from the transmitter (especially for small cells such as femtocells and/or picocells, which may use lower power transceivers).

As a result of the different signal strength profiles and other differences in signal properties experienced by airborne devices, the above methods may be applied exclusively to airborne devices (e.g. drones) so that the training and test data all relate to airborne devices.

Each data record may further comprise an altitude measurement of the mobile device.

The model may be configured for use with signal measurements relating to a predetermined range of altitudes and the altitude measurement of the mobile device may lie within the predetermined range of altitude measurements.

As a result of the different signal strength profiles and other differences in signal properties experienced by drones, the model may obtain training and test data from drones operating around the same altitude. For example, one model may be applied to drones having altitude from 100 m to 500 m. A different model may be used for drones having an altitude between 500 m and 2 km. There may be different models for every band of 100 m, so that a first model may be used for drones below 100 m, a second model may be used for drones from 100 m to 200 m, a third model may be used for drones from 200 m to 300 m, and so on. The intervals may be 200 m, 250 m, 300 m etc., rather than 100 m in the example above.

Alternatively, the altitude of the mobile device may be another parameter that is provided to the model (during training and test). In this way, the model may be able to account for differing signal properties at different altitudes. Where the model makes use of neural networks or other machine learning techniques, altitude may be incorporated as an additional parameter and accounted for automatically.

The plurality of signal measurements and respective cell identifiers obtained from the mobile device may be suitable for determining whether a handover procedure of the device should be initiated.

Mobile devices in a telecommunications network are configured to transmit measurement records so that handover procedures may be initiated and configured. The above methods may make use of data that is already available in the network to estimate the geographic locations of the mobile devices. Advantageously, the devices do not have to be configured to transmit additional data. These methods may be used with all existing mobile devices operating in the network. Moreover, the mobile devices may be required to send this date in order for handover to work. There may therefore be no mechanism for the mobile devices to opt out so that their signal measurements are not used for geolocation estimation. By using these methods rather than GPS/Cell-Id-based location methods, the mobile terminal battery life may also be extended.

The plurality of signal measurements may comprise: one or more signal strength measurements; one or more RSSI measurements; one or more RSRP measurements; one or more signal quality measurements; and/or one or more RSRQ measurements. The plurality of signal measurements may comprise one or more location measurements. The mobile device may determine its location and this may be included the data record. The data record may further comprise one or more Timing Advance (TA) measurements.

Where the ordered list of signal properties comprises a plurality of measurements for each signal, a cell identifier may correlate with more than one position in the ordered list of signal properties. For example, the ordered list may contain signal strength properties for a list of cell identifiers in a predefined order, followed by signal quality properties for the list of cell identifiers in the same predefined order. Alternatively, a plurality of ordered lists may be provided such that a first list comprises signal strength properties in a predefined order and a second list comprises signal quality properties in a predefined order.

The ordered list of signal properties may be only one part of the "fingerprint", which may further include other data from the mobile device, such as altitude (as mentioned above), serving cell data and other data characterising the network conditions experienced by the mobile device. Moreover, other data characterising the mobile device could be included, such as weight, speed etc. Advantageously, by providing further data indicating the network conditions at the geographic location, the model may be able to more accurately estimate the geographic location of the mobile device.

The method may further comprise receiving, at the mobile device, a plurality of signals from a subset of the plurality of cells. Each signal may comprise encoded data. The encoded data may comprise a cell identifier attributed to the cell from which the signal was received. The method may further comprise, for each of the plurality of received signals, determining one or more signal measurements. The method may further comprise, for each of the plurality of received signals, decoding the signal and determining the cell identifier encoded within the signal. The method may further comprise communicating a data record comprising the signal measurements and respective cell identifiers to a cell of the plurality of cells. Alternatively, the mobile device may communicate the data record to a base station (e.g. serving base station) or server in the telecommunications network.

Obtaining the signal measurements and respective cell identifiers may comprise receiving the signal measurements and respective cell identifiers from the mobile device.

Determining a signal measurement for each of the plurality of cell identifiers may further comprise, if the mobile device has received more than one signal encoding the cell identifier, the received signal measurement for the cell identifier is equal to the greatest received signal measurement of the signals (e.g. the greatest signal strength measurement or the greatest signal quality measurement). This may be appropriate where cell identifiers are reused for different cells at different geographical locations in the network (e.g. Physical Cell ID).

Each cell may have a unique cell identifier (e.g Cell Global Identity, CGI).

A method of correlating each signal property in an ordered list of signal properties to a corresponding cell identifier based on an index of the signal property in the ordered list of signal properties is provided. The ordered list of signal properties is suitable for input to a model for estimating a geographic position of a mobile device based on a plurality of signal measurements. The method comprises reading one or more data records. Each data record comprises a plurality of signal data entries. Each signal data entry corresponds to a signal received by a mobile device. Each signal data entry comprises a signal measurement of the signal, and a respective cell identifier assigned to a cell from which the signal was received. The method further comprises, for each data record of the one or more data records and for each signal data entry of the plurality of signal data entries in the data record, reading the cell identifier of the signal data entry. The method further comprises, for each unique cell identifier read from the plurality of signal data entries and from the one or more data records, correlating a signal property in an ordered list of signal properties with the corresponding unique cell identifier, based on an index of the signal property in the ordered list of signal properties.

There may be a one-to-one mapping from index to cell identifier. This does not mean that the index and cell identifier are the same (although this is a possibility). Alternatively, each index of the ordered list corresponds to a cell identifier but multiple indexes in the list may refer to the same cell identifier. This may be useful where more than one measurement is provided for each signal.

Advantageously, the above methods may be used when processing measurement records received from mobile devices so that the data may be provided to a model (for estimating a geographic location of a mobile device based on a plurality of signal measurements) in a consistent way. As a result, the model may operate more accurately to estimate a geographic location of a mobile device, for example.

A method of generating an ordered list of signal properties is provided. The method comprises reading a data record comprising a plurality of signal data entries. Each signal data entry corresponds to a signal received by a mobile device. Each signal data entry comprises a received signal measurement of the signal, and a respective cell identifier assigned to a cell from which the signal was received. The method further comprises, for each signal data entry of the plurality of signal data entries in the data record, populating a signal property in the ordered list of signal properties with the signal measurement of the signal data entry. The updated signal property is correlated to the corresponding cell identifier of the signal data entry, based on an index of the signal property in the ordered list of signal properties.

The ordered list can be used for training, validation and test (estimation) data.

Advantageously, the methods described above for processing data can be used to manipulate measurement records from one or more mobile devices into a format that allows models (especially machine learning models) to more accurately estimate the geographic location of the one or more mobile devices.

The method may further comprise initialising each signal property in the ordered list with a value indicating that no signal has been received. This property could be 0 or −99999, for example. This value may be different dependent on the type of measurement. For example, a signal quality value may be 0 if no signal is received, whereas a signal strength value may be −999 if no signal is received.

Each cell identifier may be a Physical Cell ID (PCI).

Each cell identifier may be a Cell Global Identity (CGI). The cell identifier may comprise more than one identifier. For example, the cell identifier may comprise a PCI and CGI.

In order to further improve the accuracy of estimation of geographic location, the model may include some knowledge of how the cell identifiers are arranged geographically. This may be performed using Automatic Neighbour Relation (ANR) techniques.

Correlating cell identifiers with signal properties in an ordered list, based on the indexes of those properties in the ordered list may be achieved by defining the structure of the ordered list using indexing. Indexing provides a definition of how elements in an ordered list are correlated with other data. In this case, an indexing scheme may comprise an ordered list of cell identifiers, where the ordering of the cell identifiers in the indexing scheme correlate to the ordering of the corresponding signal measurements in the ordered list of signal properties.

A method of estimating a geographic location of a mobile device configured to communicate using a telecommunications network comprising a plurality of cells is provided. The method comprises obtaining one or more data records from the mobile device, wherein each data record comprises a plurality of signal measurements and respective cell identifiers. Each signal measurement relates to a signal received by the mobile device from a cell of the plurality of cells attributed with the respective cell identifier. The method further comprises, for each data record, generating an ordered list (e.g. an array or vector) of signal properties comprising the plurality of signal measurements. The ordered list of signal measurements complies with an indexing scheme. The indexing scheme correlates each signal property in the ordered list of signal properties with a corresponding cell identifier assigned to the cell from which the signal was received, based on an index of the signal property in the ordered list of signal properties. In other words, each signal measurement of the plurality of signal measurements appears in the ordered list at a position having an index corresponding to the respective cell identifier of the signal measurement. The method further comprises estimating the geographic location of the mobile device based on the ordered list of signal properties.

The geographic location of the mobile device may be a first geographic location of the mobile device at a first time. The plurality of signal measurements and respective cell identifiers may be a first plurality of signal measurements and respective cell identifiers. The ordered list of signal properties may be a first ordered list of signal properties. The method may further comprise estimating a second geographic location of the mobile device at a second time different from the first time. Estimating the second geographic location of the mobile device may comprise obtaining a second plurality of signal measurements and respective cell identifiers from the mobile device. Each signal measurement of the second plurality of signal measurements may relate to a signal received by the mobile device from a cell of the plurality of cells attributed with the respective cell identifier. Estimating the second geographic location of the mobile device may further comprise generating a second ordered list of signal properties comprising the second plurality of signal measurements. The second ordered list may also comply with the indexing scheme. Estimating the second geographic location of the mobile device may further comprise estimating the second geographic location of the mobile device based on the second ordered list of signal properties.

Advantageously, the ordering of signal properties within each of the first and second ordered list of signal properties is the same (because each list complies with the same indexing scheme). In this way, the first ordered list of signal properties and the second ordered list of signal properties each comprise signal measurements that are correlated by the indexing scheme with corresponding cell identifiers, based on an index of the signal property in the respective ordered list of signal properties. As a result the model may perform location estimation more efficiently because there is no need to correlate measurements with cell identifiers. Moreover, the model may not require knowledge of the indexing scheme. The model may not need to directly correlate cell identifiers with signal properties because it may be sufficient to know that signal properties in the same position in their respective ordered list relate to the same cell identifier.

A method of training a model (e.g. a classifier, neural network, or other machine learning component) for estimating a geographic location of a mobile device based on a plurality of signal measurements is provided. The method comprises obtaining a plurality of signal measurements and respective cell identifiers from a mobile device, along with a corresponding measurement of the geographic location of the mobile device. The mobile device is configured to communicate using a telecommunications network comprising a plurality of cells. Each signal measurement relates to (indicates a received signal power of) a signal received by the mobile device from a cell of the plurality of cells attributed with the respective cell identifier. The method further comprises generating an ordered list (e.g. array or vector) of signal properties comprising the plurality of signal measurements. The ordered list complies with an indexing scheme correlating an index of each signal property in the ordered list of signal properties with a corresponding cell identifier assigned to the cell from which the signal was received, based on an index of the signal property in the ordered list of signal properties. In other words, each signal measurement of the plurality of signal measurements appears in the ordered list at a position having an index corresponding to the respective cell identifier of the signal measurement. The method further comprises providing the ordered list of signal properties and the corresponding measurement of the geographic location of the mobile device to the model.

The plurality of signal measurements may be a first plurality of signal measurements. The mobile device may be a first mobile device. The ordered list may be a first ordered list. The model may be configured to receive as an input a second ordered list of signal properties obtained from a second mobile device configured to communicate using the telecommunications network. The second ordered list of signal properties may comply with the indexing scheme. The model may be configured to provide as an output an estimation of a geographic location of the second mobile device.

The second ordered list may be received indirectly from the second mobile device. This may be because data obtained directly from the mobile device may contain signal measurements that are not ordered according to the indexing scheme. A data processor may receive the signal measurements and corresponding cell identifiers from the mobile device, process the data, and provide the second ordered list to the model.

The first and second ordered lists of signal properties may comply with the indexing scheme so that signal measurements in each of the respective ordered lists having the same index correspond to the same cell identifier.

Advantageously, the ordering of signal properties within each of the first and second ordered list of signal properties is the same (because each list complies with the same indexing scheme). In this way, the first ordered list of signal properties and the second ordered list of signal properties each comprise signal measurements that are correlated by the indexing scheme with corresponding cell identifiers, based on an index of the signal property in the respective ordered list of signal properties. As a result the model may operate more efficiently because there is no need to correlate measurements with cell identifiers. Moreover, the model may not require knowledge of the indexing scheme. The model may not need to directly correlate cell identifiers with signal properties because it may be sufficient to know that signal properties in the same position in their respective ordered list relate to the same cell identifier.

In other words, for each signal property in the ordered list corresponding to a cell identifier that is not assigned to any of the cells from which a signal has been received by the mobile device (and therefore from which no signal measurement has been obtained), a "null" value is assigned to that property in the ordered list. In this way, the ordered list of signal properties comprises a signal property for every unique cell identifier-non-null values where measurements have been obtained and null values where no measurements have been obtained.

Obtaining a plurality of signal measurements and respective cell identifiers from a mobile device may comprise obtaining respective received signal strength measurements and signal quality measurements from the mobile device. The method may further comprise generating an ordered list of signal properties comprising the plurality of received signal strength measurements and signal quality measurements. The ordered list of signal properties may comply with an indexing scheme correlating each signal property in the ordered list of signal properties with a corresponding cell identifier assigned to the cell from which the signal was received, based on an index of the signal quality property in the ordered list of signal quality properties. Estimating the geographic location of the mobile device based on the ordered list of signal properties (for the estimation method) would therefore take the signal strength properties and signal quality properties into account. Alternatively (for the training method), providing the model with the ordered list of signal properties in association with the corresponding measurement of the geographic location of the mobile device would then comprise providing the model with the signal strength properties and signal quality properties (ordered so that their indexes are correlated with the corresponding cell identifiers) in association with the corresponding measurement of the geographic location of the mobile device.

A method of generating an indexing scheme is provided. The indexing scheme is suitable for correlating each signal property in an ordered list of signal properties to a corresponding cell identifier based on an index of the signal property in the ordered list of signal properties. The ordered list of signal properties is suitable for input to a model (for estimating a geographic location of a mobile device based on a plurality of signal measurements). The method comprises generating an indexing scheme. The method further comprises reading one or more data records. Each data record comprises a plurality of signal data entries. Each signal data entry corresponds to a signal received by a mobile device. Each signal data entry comprises a received signal measurement of the signal, and a respective cell identifier assigned to a cell from which the signal was received. The method further comprises, for each data record of the one or more data records and for each signal data entry of the plurality of signal data entries in the data record, reading the cell identifier of the signal data entry. The method further comprises, for each unique cell identifier read from the plurality of signal data entries and from the one or more data records, updating the indexing scheme to correlate a signal property in an ordered list of signal properties with the corresponding unique cell identifier, based on an index of the signal property in the ordered list of signal properties.

Advantageously, the indexing scheme generated by the above methods may be used when processing measurement records received from mobile devises so that the data may be provided to a model (e.g. for estimating a geographic location of a mobile device based on a plurality of signal measurements) in a consistent way. As a result, the model may operate more accurately to estimate a geographic location of a mobile device, for example.

A method of generating an ordered list of signal properties is provided. The method comprises reading an indexing scheme for correlating each signal property in an ordered list of signal properties to a corresponding cell identifier, based on an index of the signal property in the ordered list of signal properties. The method further comprises generating an ordered list of signal properties. The method further comprises reading a data record comprising a plurality of signal data entries. Each signal data entry corresponds to a signal received by a mobile device. Each signal data entry comprises a received signal measurement of the signal, and a respective cell identifier assigned to a cell from which the signal was received. The method further comprises, for each signal data entry of the plurality of signal data entries in the data record, updating a signal property in the ordered list of signal properties with the signal measurement of the signal data entry. The updated signal property is correlated to the corresponding cell identifier of the signal data entry, based on an index of the signal property in the ordered list of signal properties, as defined by the indexing scheme.

The ordered list of signal properties may comply with the indexing scheme. The ordered list of signal properties may contain a number of signal properties as defined by the indexing scheme.

The indexing scheme may be generated by a method as described above.

Generating an ordered list of signal properties that complies with the indexing scheme may comprise initialising each signal property in the ordered list with a signal property indicating that no signal has been received. This property could be 0 or –99999, for example. This value may be different dependent on the type of measurement. For example, a signal quality value may be 0 if no signal is received, whereas a signal strength value may be –999 if no signal is received.

The indexing scheme may comprise an ordered list of cell identifiers. The indexing scheme may correlate a signal property in an ordered list of signal properties to an identifier in the ordered list of cell identifiers. The index of the signal property in the ordered list of signal properties may be the same as the index of the corresponding cell identifier in the ordered list of cell identifiers.

In other words, the indexing scheme may correlate a signal property in an ordered list of signal properties and having an index in the ordered list of signal properties to a corresponding cell identifier having the same index in the ordered list of cell identifiers.

A system configured to perform any of the methods described above is also provided. The system may be a telecommunications network or a particular component in a telecommunications network.

Elements of the system may be provided by computer systems. A computer system may comprise a processor, memory, data input and data output. The memory of the computer system may store instructions in the form of software. When executed on the processor, the instructions may cause the computer system to perform the method steps required to implement the techniques described in this application.

Whilst certain operations are described as being performed by specific elements of the system, these operations may be performed in a distributed manner, with some elements of the operation being performed by one system element and other elements being performed by another system element.

Computer software is also provided. The computer software comprises computer-readable instructions that, when executed by a processor of a computer system, causes the computer system to perform any of the methods described above.

An electromagnetic signal is also provided. The electromagnetic signal carries computer-readable instructions that, when executed by a processor of a computer system, causes the computer system to perform any of the methods described above.

A computer-readable medium is also provided. The computer-readable medium comprises instructions that, when executed by a processor of a computer system, causes the computer system to perform any of the methods described above.

BRIEF DESCRIPTION OF THE FIGURES

The present invention will now be described in more detail with reference to a number of non-limiting examples, depicted in the following figures in which:

FIG. 4 illustrates a flowchart of a method of estimating the geographic location of a mobile device.

FIG. 5 illustrates a flowchart of a method of providing training data to a model for estimating a geographic location of a mobile device based on a plurality of signal measurements.

FIG. 6 illustrates a flowchart of a method of correlating each signal property in an ordered list of signal properties to a corresponding cell identifier based on an index of the signal property in the ordered list of signal properties.

FIG. 8 illustrates a flowchart of a method of restructuring the data in a specific implementation.

DETAILED DESCRIPTION

Existing information representation format from an MR (Measurement Report) uses nominal numbering to identify neighbour cells. Systems for defining the numbering may be different depending on the mobile service provider. These Measurement Reports may be used for determining when to perform handover and to which neighbour cell handover should be performed. They may also be used for re-establishment of a connection after signal has been lost. To support these operations, the ordering of the neighbour cells in the MR may be from the neighbour with the strongest RSRP at position #1 to the neighbours with weaker RSRP values at higher numbers. Alternatively, the Reference Signal Receive Quality may be the criterion on which the list is sorted. Measurement reporting is defined in the 3GPP specification TS 36.331 for LTE (4G) and TS 38.331 for NR (5G), both of which are herein incorporated by reference.

It is already known to use Measurement Reports to estimate the geographic location of the mobile device. RPS techniques provide the MRs to Machine Learning ML models to train and estimate geographic location. However, the nominal numbering of the neighbouring cells in the measurement report may be misleading for Machine Learning (ML) models to learn patterns.

For a given sample MR, a mobile device may report multiple neighbour cells that have similar Reference Signal Receive Power (RSRP). From the measurement reports, it is not always clear which cell is the #1 neighbour cell in the MR and which is #2 and so on. Instead, the MR structuring systems can sometimes use arbitrary and nominal numbering for neighbour cells information representation. The nominal numbering systems in these MRs can mislead the ML model and prevent the model from learning useful features (e.g. neighbour PCIs) and correlating each neighbour cell with its corresponding radio signal profile (e.g. RSRP).

Figure 1:
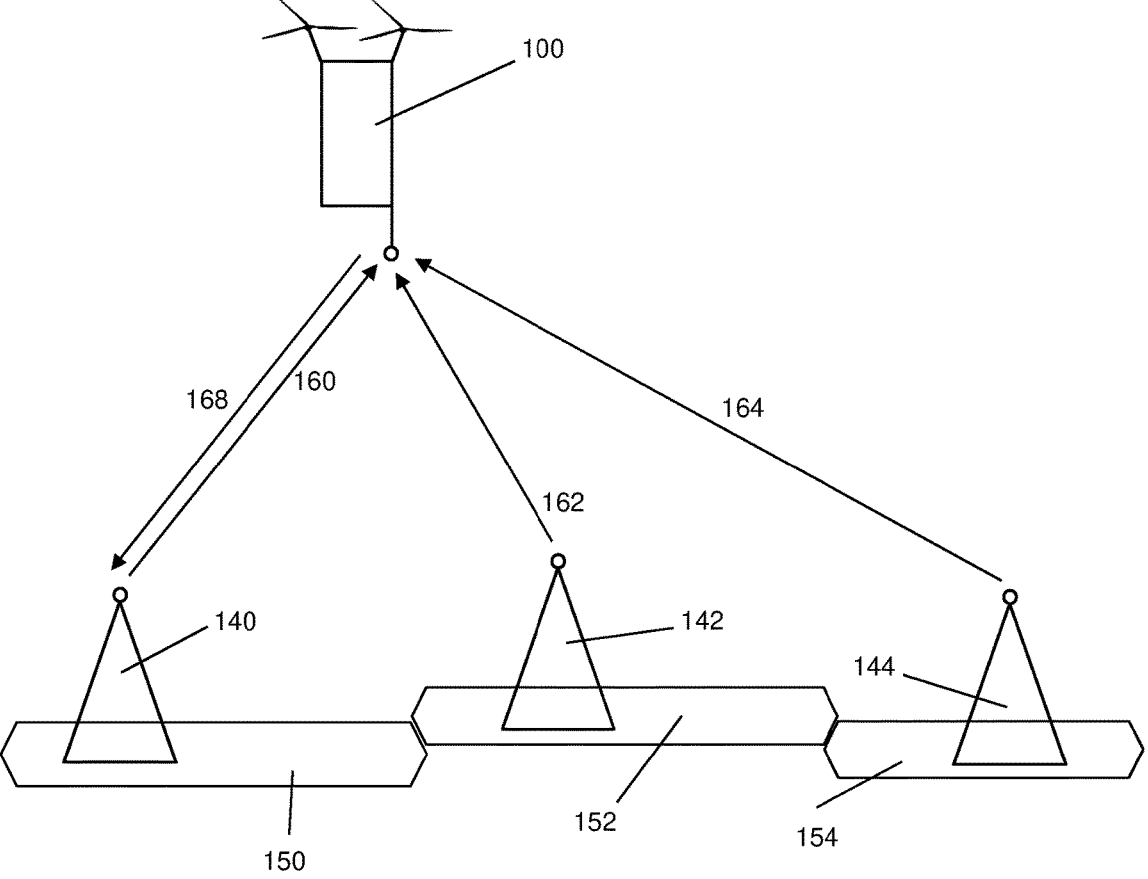
FIG. 1 illustrates a mobile device configured to communicate with a telecommunications network.

Referring to FIG. 1, there is illustrated a mobile device 100 configured to communicate with a cellular telecommunications network. The telecommunications network comprises a plurality of cell transceivers 140, 142 and 144 and associated cells 150, 152 and 154. The mobile device in this specific non-limiting example is an unmanned aerial vehicle (UAV). The mobile device is configured to receive signals 160, 162 and 164 from cells 150, 152 and 154. For each received signal, the mobile device measures a property of the received signal (e.g. by measuring the received signal strength and/or quality) and determines a cell identifier indicating which cell transmitted the signal. The mobile device generates a measurement record from the signal measurement and cell identifier information and this measurement record (MR) is sent to one or more of the cells as a signal 168. Alternatively, the MR may be sent to another entity in the network.

In this Figure, each cell transceiver is shown as a discrete tower. However, in some cases a single tower may comprise cell transceivers serving different cells. The cell transceivers may be base stations. A base station may serve more than one cell. The reference signals are each associated with a cell so this application generally refers to signals from cells. Nevertheless, the invention could be implemented using base station identifiers, rather than cell identifiers.

Figure 2:
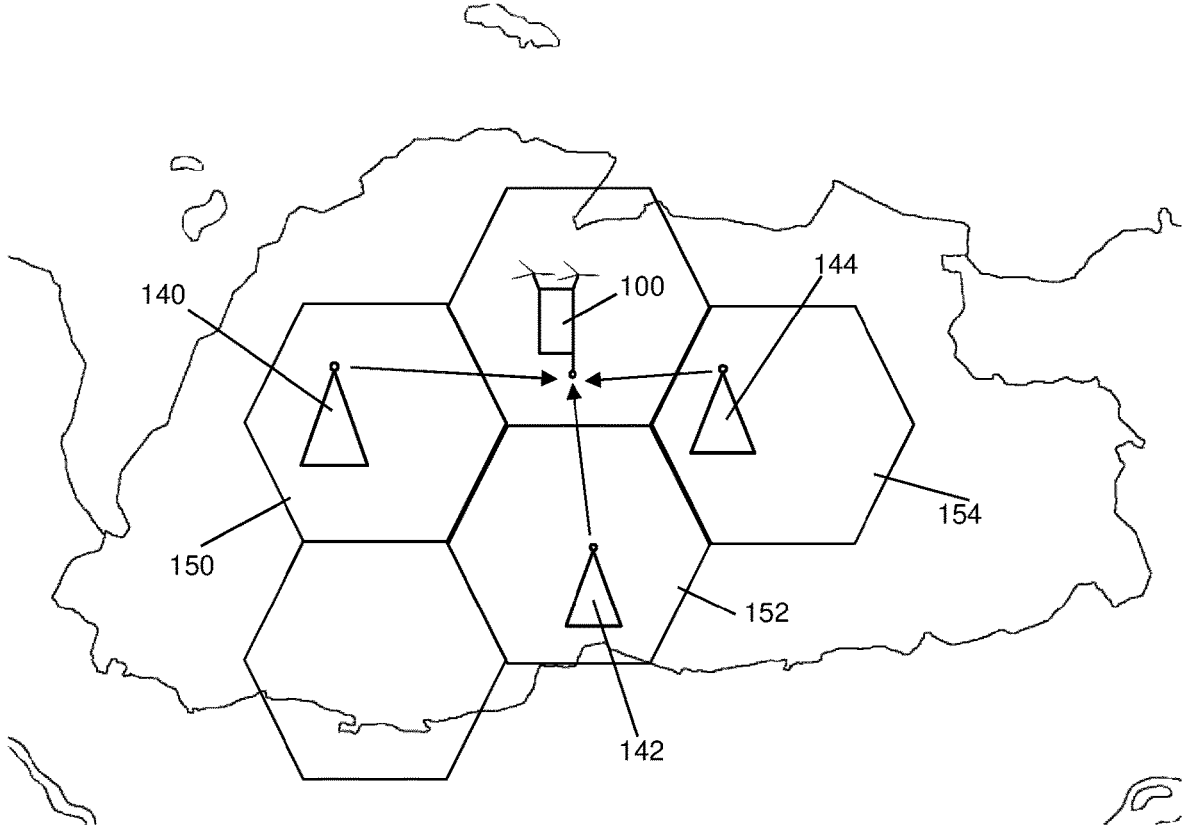
FIG. 2 illustrates a map showing example geographic locations of a mobile device and three cells.

Referring to FIG. 2, the measurement record may be used to estimate a geographic location of the mobile device 100, based on the signal measurements and cell identifiers in the measurement record that relate to cells 150, 152 and 154 in the geographic vicinity of the mobile device.

There may be a plurality of cells in the telecommunications network that are assigned with the same cell identifier. In other words, the cell identifiers may be reused at different geographic locations around the network. However, the reuse scheme should be planned so that neighbouring cells do not share a cell identifier. Moreover the reuse scheme should be planned so that no cell has more than one neighbour with the same cell identifier. The combination of signals received at a mobile device at any geographic location in the network, along with the respective cell identifiers and signal measurements of those signals, should be sufficient to provide a good estimate of the geographic location of the mobile device. This is because the planning of the reuse scheme, along with the combination of signals received from all neighbour cells in the geographic area should allow the model to determine which cell each signal relates to, even though the cell identifiers may not be unique.

Physical Cell ID (PCI) may be used as the cell identifier. There are 504 available PCIs for use in an LTE telecommunications network. To avoid PCI collisions, neighbouring cells must not share a PCI. To avoid PCI confusion, no cell in the network can have two neighbours that share the same PCI.

To address the data issues that arise in prior art RPS techniques, an innovative feature engineering method is provided. This method may be used to combine and reformat neighbour cell data representation into a new format. In this new format, arbitrary and nominal numbering as neighbour cell features, which causes ML models confusion and mis-interpretation of neighbour cells information, is removed from both training and testing data. Instead, in this new format, distinct neighbour cell PCIs (for both training and testing data) are identified and set as new columns/features/elements in the data.

Per row/record/MR, if a neighbour cell identified by its PCI was reported and present, its row value (signal property in the ordered list of signal properties) is populated with its corresponding radio information (i.e. RSRP value). Otherwise, its row value is filled with zero. Alternatively, a different value may be used to signify that a cell identified by its PCI has not been reported (e.g. 999 or −999). In this way, a clear and explicit association between each neighbour cell and its radio signal profile is built for all MRs/records collected in a geo-area of interest. This approach may greatly improve input data quality and may also remove neighbour information ambiguity.

The newly regenerated sub-dataframe regarding neighbour cell information (the ordered list of signal properties) is merged back to the original dataframes (which got 'old' neighbour cell representation removed) to form new "modified" dataframes. In other words, the tuples in the measurement records providing neighbour cell information are replaced by an ordered list of signal properties. This may be performed for both training and testing data.

The reconstructed dataframes are used to train an existing ML model. This may be performed without modifying the other data in the measurement record or changing the ML model. In doing so, model prediction accuracy enhancement may be observed. This accuracy enhancement may exceed the performance of previous models.

In summary, the whole data set is transformed and reconstructed to provide complete and more accurate neighbouring information to ML models, which in turn can better detect & learn hidden patterns and radio FPs.

Table 1 illustrates an example of ten measurement records communicated to the network from a mobile device. Table 2 illustrates how the measurement records of Table 1 may be restructured before being provided to a model.

TABLE 1

|  | MR1 | MR2 | MR3 | MR4 | MR5 |
|---|---|---|---|---|---|
| lat (degrees) | 41.8089 | 41.8089 | 41.80889 | 41.80888 | 41.80888 |
| lon (degrees) | 2.16326 | 2.16325 | 2.16322 | 2.16321 | 2.16318 |
| alt (m) | 1000 | 1000 | 1000 | 1000 | 1000 |
| serving PCI | 323 | 323 | 323 | 323 | 323 |
| servingenodeb | 81947-7 | 81947-7 | 81947-7 | 81947-7 | 81947-7 |
| serving rsrp (dBm) | −97 | −97 | −102.6 | −102 | −103 |
| serving rsrq (dB) | −12.8 | −13 | −15.4 | −14.5 | −15 |
| pci_neigh_1 | 290 | 322 | 322 | 45 | 45 |
| rsrp_neigh_1 | −106 | −104 | −107.8 | −109 | −111 |
| pci_neig_2 | 322 | 0 | 483 | 143 | 143 |
| rsrp_neigh_2 (dBm) | −105 | 0 | −109.6 | −109 | −110 |
| pci_neigh_3 | 0 | 0 | 290 | 251 | 251 |
| rsrp_neigh_3 (dBm) | 0 | 0 | −107.5 | −109 | −109 |
| pci_neigh_4 | 0 | 0 | 251 | 290 | 290 |
| rsrp_neigh_4 (dBm) | 0 | 0 | −107.7 | −107 | −103.5 |
| pci_neigh_5 | 0 | 0 | 45 | 322 | 322 |
| rsrp_neigh_5 (dBm) | 0 | 0 | −109 | −108 | −109 |
| pci_neigh_6 | 0 | 0 | 143 | 0 | 483 |
| rsrp_neigh_6 (dBm) | 0 | 0 | −110 | 0 | −109.5 |
| pci_neigh_7 | 0 | 0 | 0 | 0 | 0 |
| rsrp_neigh_7 (dBm) | 0 | 0 | 0 | 0 | 0 |
| . . . | . . . | . . . | . . . | . . . | . . . |
| . . . | . . . | . . . | . . . | . . . | . . . |
| pci_neigh_32 | 0 | 0 | 0 | 0 | 0 |
| rsrp_neigh_32 (dBm) | 0 | 0 | 0 | 0 | 0 |
| num_neig_cells | 2 | 1 | 6 | 5 | 6 |

TABLE 1-continued

|  | MR6 | MR7 | MR8 | MR9 | MR10 |
|---|---|---|---|---|---|
| lat (degrees) | 41.80888 | 41.80888 | 41.80889 | 41.80891 | 41.809 |
| lon (degrees) | 2.16316 | 2.16314 | 2.16312 | 2.16309 | 2.16307 |
| alt (m) | 1000 | 1000 | 1000 | 1000 | 1000 |
| serving PCI | 323 | 323 | 323 | 323 | 323 |
| servingenodeb | 81947-7 | 81947-7 | 81947-7 | 81947-7 | 81947-7 |
| serving rsrp (dBm) | −102.5 | −101.5 | −101 | 98.7 | −109 |
| serving rsrq (dB) | −15.2 | 14.2 | −13.5 | −13.3 | −15 |
| pci_neigh_1 | 45 | 45 | 45 | 45 | 251 |
| rsrp_neigh_1 | −109 | −109 | −110 | 110 | −114 |
| pci_neig_2 | 54 | 54 | 251 | 251 | 290 |
| rsrp_neigh_2 (dBm) | −109 | −108 | −107 | −107 | −110 |
| pci_neigh_3 | 251 | 251 | 290 | 290 | 322 |
| rsrp_neigh_3 (dBm) | −105.5 | 106.5 | −108 | −106.7 | −116 |
| pci_neigh_4 | 290 | 290 | 322 | 322 | 0 |
| rsrp_neigh_4 (dBm) | −103.5 | −105.5 | −108 | −107 | 0 |
| pci_neigh_5 | 322 | 322 | 405 | 405 | 0 |
| rsrp_neigh_5 (dBm) | −108.5 | −107 | −110 | −110 | 0 |
| pci_neigh_6 | 483 | 405 | 483 | 0 | 0 |
| rsrp_neigh_6 (dBm) | −109 | −109.5 | −109 | 0 | 0 |
| pci_neigh_7 | 0 | 0 | 0 | 0 | 0 |
| rsrp_neigh_7 (dBm) | 0 | 0 | 0 | 0 | 0 |
| . . . | . . . | . . . | . . . | . . . | . . . |
| . . . | . . . | . . . | . . . | . . . | . . . |
| pci_neigh_32 | 0 | 0 | 0 | 0 | 0 |
| rsrp_neigh_32 (dBm) | 0 | 0 | 0 | 0 | 0 |
| num_neig_cells | 6 | 6 | 6 | 5 | 3 |

TABLE 2

|  | MR1' | MR2' | MR3' | MR4' | MR5' |
|---|---|---|---|---|---|
| lat (degrees) | 41.80891 | 41.8089 | 41.80889 | 41.80888 | 41.80888 |
| lon (degrees) | 2.16326 | 2.16325 | 2.16322 | 2.16321 | 2.16318 |
| alt (m) | 1000 | 1000 | 1000 | 1000 | 1000 |
| serving PCI | 323 | 323 | 323 | 323 | 323 |
| servingenodeb | 81947-7 | 81947-7 | 81947-7 | 81947-7 | 81947-7 |
| ta ($T_s$) | 85 | 85 | 85 | 85 | 84 |
| serving rsrp (dBm) | −97 | −97 | −102.6 | −102 | −103 |
| serving rsrq (dB) | −12.8 | −13 | −15.4 | 14.5 | −15 |
| 128 (rsrp dBm) | 0 | 0 | 0 | 0 | 0 |
| 386 (rsrp dBm) | 0 | 0 | 0 | 0 | 0 |
| . . . | . . . | . . . | . . . | . . . | . . . |
| 143 (rsrp dBm) | 0 | 0 | −110 | −109 | −110 |
| . . . | . . . | . . . | . . . | . . . | . . . |
| 405 (rsrp dBm) | 0 | 0 | 0 | 0 | 0 |
| . . . | . . . | . . . | . . . | . . . | . . . |
| 290 (rsrp dBm) | −106 | 0 | −107 | −107 | −103 |
| . . . | . . . | . . . | . . . | . . . | . . . |
| 45 (rsrp dBm) | 0 | 0 | −109 | −109 | −111 |
| . . . | . . . | . . . | . . . | . . . | . . . |
| 54 (rsrp dBm) | 0 | 0 | 0 | 0 | 0 |
| . . . | . . . | . . . | . . . | . . . | . . . |
| 322 (rsrp dBm) | −105 | −104 | −107 | −108 | −109 |
| 323 (rsrp dBm) | 0 | 0 | 0 | 0 | 0 |
| . . . | . . . | . . . | . . . | . . . | . . . |
| 483 (rsrp dBm) | 0 | 0 | −109 | 0 | −109 |
| . . . | . . . | . . . | . . . | . . . | . . . |
| 251 (rsrp dBm) | 0 | 0 | −107 | −109 | −109 |
| . . . | . . . | . . . | . . . | . . . | . . . |

|  | MR6' | MR7' | MR8' | MR9' | MR10' |
|---|---|---|---|---|---|
| lat (degrees) | 41.80888 | 41.80888 | 41.80889 | 41.80891 | 41.809 |
| lon (degrees) | 2.16316 | 2.16314 | 2.16312 | 2.16309 | 2.16307 |
| alt (m) | 1000 | 1000 | 1000 | 1000 | 1000 |
| serving PCI | 323 | 323 | 323 | 323 | 323 |
| servingenodeb | 81947-7 | 81947-7 | 81947-7 | 81947-7 | 81947-7 |
| ta ($T_s$) | 85 | 84 | 85 | 85 | 84 |
| serving rsrp (dBm) | −102.5 | −101.5 | −101 | −98.7 | −109 |
| serving rsrq (dB) | −15.2 | −14.2 | −13.5 | −13.3 | −15 |
| 128 (rsrp dBm) | 0 | 0 | 0 | 0 | 0 |
| 386 (rsrp dBm) | 0 | 0 | 0 | 0 | 0 |
| . . . | . . . | . . . | . . . | . . . | . . . |
| 143 (rsrp dBm) | 0 | 0 | 0 | 0 | 0 |
| . . . | . . . | . . . | . . . | . . . | . . . |

TABLE 2-continued

| | | | | | |
|---|---|---|---|---|---|
| 405 (rsrp dBm) | 0 | −109 | −110 | −110 | 0 |
| . . . | . . . | . . . | . . . | . . . | . . . |
| 290 (rsrp dBm) | −103 | −105 | −108 | −106 | −110 |
| . . . | . . . | . . . | . . . | . . . | . . . |
| 45 (rsrp dBm) | −109 | −109 | −110 | −110 | 0 |
| . . . | . . . | . . . | . . . | . . . | . . . |
| 54 (rsrp dBm) | 0 | −109 | −108 | 0 | 0 |
| . . . | . . . | . . . | . . . | . . . | . . . |
| 322 (rsrp dBm) | −108 | −107 | −108 | −107 | −116 |
| 323 (rsrp dBm) | 0 | 0 | 0 | 0 | 0 |
| . . . | . . . | . . . | . . . | . . . | . . . |
| 483 (rsrp dBm) | −109 | 0 | −109 | 0 | 0 |
| . . . | . . . | . . . | . . . | . . . | . . . |
| 251 (rsrp dBm) | −105 | −106 | −107 | −107 | −114 |
| . . . | . . . | . . . | . . . | . . . | . . . |

Table 1 illustrates an example of ten measurement records (MR1 to MR10) communicated to the network from a mobile device. In this example, the Measurement Records (MRs) belong to a training dataset. Therefore, each MR comprises latitude and longitude information transmitted from the mobile device. Likewise, validation data may also contain location measurement data. If this were test data, rather than training data, the same principles would apply but the latitude and longitude measurements would be absent. As can be seen in Table 1, each MR further comprises a list of neighbour cell PCI and RSRP values numbered from 1 to 32. In this example, each MR has no data for neighbours 7 to 32. The rows of the Table corresponding to neighbours 8 to 31 are therefore omitted, for brevity. In this example, each MR also comprises some further information, such as the altitude of the drone, the PCI of the serving cell, the identifier of the Serving eNodeB ("servingenodeb"), RSRP and RSRQ values of the serving cell, and the like.

Timing Advance (TA) May be added to the measurement record by the eNB. Timing Advance is expressed in units of $T_s$, which is the basic time unit defined in the 3GPP standard. Timing advance is a "negative" offset, at the UE, between the start of a received downlink subframe and a transmitted uplink subframe. This may allow the UE to synchronize uplink and downlink transmissions. The TA value may be continually measured by the eNB and can be dynamically adapted and signalled to the eNB. TA is a measurement of time so can be expressed in microseconds. However, it is more usual to express TA in multiples of a basic time unit ($T_s$), which is defined in 3GPP standard 36.211. For example, $T_s=1/(\text{subcarrier spacing} \times \text{FFT-size block-by-block})$; $T_s=1/(15000 \times 2048)$ seconds=0.0325 microseconds. This may be for an LTE network where the subcarrier spacing is 15 kHZ and the FFT-size block-by-block is 2048. These numbers will likely be different for a 5G network so the basic time unit will be different (e.g. subcarrier spacing can be 30 kHz or 60 kHz depending on the spectrum frequency).

Table 2 illustrates how the measurement records of Table 1 (MR1 to MR10) may be restructured before being provided to a model. This particular example shows that each restructured measurement record (MR1' to MR10') is represented by a column in the table and the table comprises a row for each PCI in the data set. In this example, the rows corresponding to PCIs for which no RSRP values are available for any of the MRs have been omitted. However, every available PCI may have a row in the table. The table could equally be configured so that each MR is represented by a row and the table comprises a column for each PCI in the data set. Importantly, the ordering of the signal properties for each measurement record is the same as the ordering for each other measurement record. Likewise, the ordering of the signal properties for the training and test data follow the same ordering system.

It should be noted that the signal strength values correlated to PCI 323 are all populated with "0" values. This is significant because 323 is the PCI of the serving cell for all the measurement records in this example. In the method used to modify the measurement records in this specific example, only data for neighbour signal strength measurements in the original MR is used to populate the ordered lists that form part of the updated measurement records (MR1' to MR10'). In an alternative method, it may be beneficial to incorporate the signal strength measurement for the serving cell into the ordered list, as well as the signal strength measurements for the neighbour cells.

Figure 3:
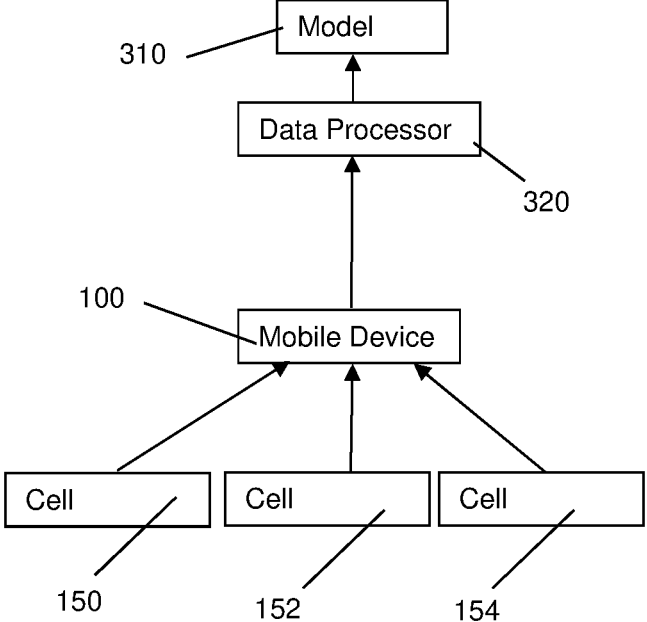
FIG. 3 illustrates a system and data flow diagram.

FIG. 3 illustrates a system and data flow diagram. Reference signals sent from one or more cells 150, 152 and 154 are received by a mobile device 100. The mobile device 100 determines a signal measurement of each signal and a cell identifier associated with the cell from which the signal was received. The mobile device 100 generates a measurement record comprising the signal properties and respective cell identifiers. The mobile device 100 sends the measurement record to a data processor 320. The measurement record may be sent to the data processor 320 by sending the measurement record to one of the cells 150, 152 and 154 from which a reference signal was received or a different cell. The measurement record may be sent to the data processor 320 by sending the measurement record to a base station associated with a cell. The cell/base station provides the measurement record to a data processor 320 in the network or comprises a data processor 320. The data processor 320 reads the signal measurements and cell identifiers in the measurement record and generates an ordered list of signal properties. The data processor 320 provides the ordered list of signal properties to a model 310, along with any other required information from the measurement record.

The measurement record may also comprise a geographic location of the mobile device 100. In this case, the model may use the location data and ordered list of signal properties (along with any other required information from the measurement record) as training data to improve the accuracy of future estimates.

The model may use the ordered list of signal properties to estimate a geographic location of the mobile device 100. This estimate of geographic location may be used elsewhere in the network. For example, the estimate of geographic location may be used to predict an arrival time of the drone at a specified location.

MRs may be collected and sent with a time interval of around 2-10 seconds. However, the methods can be performed with MRs sent with any time interval or single one-off records.

Whilst the model 310 and data processor 320 are described as being on the network side, these techniques could equally be used on the mobile device 100 itself. In this case, the step of transmitting the measurement record to a cell would not be required. The mobile device 100 could directly format/structure the signal measurements into an ordered list and use this with a model to estimate its own location. This may be advantageous in cases where the mobile device 100 is not equipped with other means by which to determine a location (e.g. GNSS). Moreover, this may save battery power compared to GNSS techniques.

FIG. 4 illustrates a flowchart of a method of estimating a geographic location of a mobile device. The method comprises the following steps:

S401: Obtain one or more data records from the mobile device, wherein each data record comprises a plurality of signal measurements and respective cell identifiers from a mobile device;

S403: For each data record, generate an ordered list of signal properties comprising the plurality of signal measurements; and S405: For each data record, estimate the geographic location of the mobile device based on the ordered list of signal properties.

FIG. 5 illustrates a flowchart of a method of providing training data to a model for estimating a geographic location of a mobile device based on a plurality of signal measurements. The method comprises the following steps:

S501: Obtain one or more data records from a mobile device, wherein each data record comprises: a plurality of signal measurements and respective cell identifiers from a mobile device and a corresponding measurement of the geographic location of the mobile device;

S503: For each data record, generate an ordered list of signal properties comprising the plurality of signal measurements; and S505: For each data record, provide the ordered list of signal properties and the corresponding measurement of the geographic location of the mobile device to the model.

FIG. 6 illustrates a flowchart of a method of correlating each signal property in an ordered list of signal properties to a corresponding cell identifier based on an index of the signal property in the ordered list of signal properties. The method comprises the following steps:

S601: Read one or more data records, wherein each data record comprises a plurality of signal data entries;

S603: For each data record and for each signal data entry in the data record, read the cell identifier of the data record; and S605: For each unique cell identifier, correlate a signal property in an ordered list with the corresponding unique cell identifier, based on an index of the signal property in the ordered list.

Figure 7:
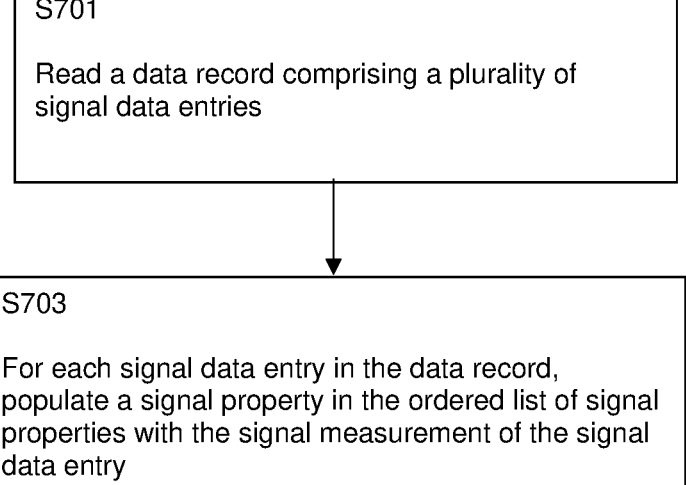
FIG. 7 illustrates a flowchart of a method of generating an ordered list of signal properties.

FIG. 7 illustrates a flowchart of a method of generating an ordered list of signal properties. The method comprises the following steps:

S701: Read a data record comprising a plurality of signal data entries; and

S703: For each signal data entry in the data record, populate a signal property in the ordered list of signal properties with the signal measurement of the signal data entry.

FIG. 8 illustrates a method performed to restructure the data in a specific implementation. The method comprises the following steps:

S801: Collect and obtain all unique neighbour cell PCIs (Physical Cell IDs) in both raw train and test sets;

S803: Generate a list/collection of (PCI, RSRP, etc.) tuples for all neighbour cells reported per row/record;

S805: Iteratively, generate such a list/collection of neighbour tuples for each record, and store all in a nested list/collection;

S807: correlates every unique PCI in the data records with an index in an ordered list of signal properties. This may be achieved using an indexing scheme in the form of table headings so that each unique neighbour PCI is set as a new column/row/feature/element in the table;

S809: Parse and convert the nested list/collection of neighbour tuples into ordered lists, whose value per row is populated with its associated tuple RSRP value. In other words, convert the tuples into an ordered list of signal properties;

S811: Build the reconstructed neighbour cell dataframe by parsing and converting all entries in the nested list/collection;

S813: Remove the original neighbour cell presentation from the raw dataframe, and merge the newly reconstructed neighbour cell dataframe with the remaining to form an updated train/test data set; and S815: Apply the updated data sets to train and test ML models.

After data transformation and reformatting, the arbitrary and nominal numbering as neighbour cell features, which may confuse and mislead ML models to learn from data, is removed from both dataframes (train and test).

The old neighbour cell information representation fails to associate each neighbour cell identified by PCI with its radio signal profile. Thanks to the novel method, a clear and explicit association is built and available for ML models to learn by filtering, combining and reconstructing neighbour cell information.

A new and novel approach is provided to exactly solve a data problem encountered in radio network measurement reporting and data collection. Rather than normalising data or performing a subset feature selection, which changes no data structure, this novel method is a 'break and build' breed to fundamentally change the neighbour cell representation structure, and regenerate it in a style unlocking more and accurate neighbour information for ML models to learn patterns and better presenting the data to the problem to solve. None of the prior art is similar or can achieve the same/similar results.

Existing prior art methods like OOB ML models, combinations, optimizations and others do not achieve sufficient accuracy in geo-location. This new method makes sense due in part to the fact that it breaks and reconstructs an improved neighbour data representation for ML models to better learn patterns and thus better address the problem.

The method replaces 'nominal numbering' with actual neighbour cell PCIs as new features/columns, and associated radio signal profiles (RSRP) which may provide more relevant and useful information for ML models to learn patterns. That is, the proposed method may offer more accurate and complete neighbour information to ML models, and avoid misleading ML models with those 'nominal numbering' for neighbour cell information representation.

Original Neighbour Cell Format:

TABLE 3

| | Pci_neigh_1 | rsrp_neigh_1 | pci_neigh_2 | rsrp_neigh_1 |
|---|---|---|---|---|
| Sample 1 | A | va | B | vb |
| Sample 2 | B | vb | A | va |

Before neighbour data reformatting and transformation, ML models may have 'thought' these two samples contain different neighbour radio fingerprints, so may make misprediction.

For a human observer, these two MR records may appear equivalent. This may be because a human observer would perform subconscious 'data re-organising and relationship reduction'. However, for a ML model, the nominal numbering (_1, _2) may cause the model to recognise neighbour _1 as being assigned with different values across samples from neighbour _2. Therefore, for the ML model, what is significant here is the feature/column name i.e. pci_neigh_1/ pci_neigh_2. Most ML models do not have human-level intelligence to 'realise' the really meaningful neighbour cell representation should be the actual neigh cell PCIs: A, B and their associated radio profiles (RSRP). What this novel method does is to make this information explicit to 'help' ML models to pick it up and learn right representation of neighbour radio fingerprints.

New Neighbour Cell Format:

TABLE 4

| | A | B | C | D | E |
|---|---|---|---|---|---|
| Sample 1 | va | vb | 0 | 0 | 0 |
| Sample 2 | va | vb | 0 | 0 | 0 |

After reformatting, the data provides a more explicit relationship between the PCI and the RSRP. ML models may therefore learn these records contain the same neighbour radio fingerprints, so make the right prediction.

The above are dummy examples to illustrate the situation. In real samples it can get much more complex and some patterns are implicit and hidden, hard for human users to comprehend. That is where Machine Learning models may be beneficial. A data-driven approach to make us if AI/machine learning techniques can assist with learning, understand and solving challenging problems.

In this application, the term "mobile device" is used to refer to the device that is configured to communicate with the telecommunications network. However, this device may equally be referred to as a "user device", "subscriber device", "mobile handset", "cellular connected device", "telecoms device", and the like.

Whilst this application generally uses the term "cell" to refer to a source of a telecommunications signal, the skilled person would understand that this signal may come from a number of different elements in a telecommunications network. For example, the signal may originate from a NodeB, an eNodeB, a microcell, a picocell, a femtocell, and the like.

Specific embodiments of the present invention are described in this application in which the signal measurement is the Reference Signal Receive Power. However, in some cases, these methods may additionally or alternatively use other measures of signal strength. For example, these methods may use the Received Signal Strength Indicator RSSI or Received Channel Power Indicator RCPI. Moreover, in future iterations of the telecommunications standards, different measurements of signal strength may be used. Such measurements of signal strength may be utilised in methods described in the present application.

Likewise, specific embodiments of the invention described above use the Physical Cell Identifier PCI as the cell identifier. These methods may additionally or alternatively use other cell identifiers, such as the Cell Identification (CI), Cell ID (CID), Enhanced Cell ID (E-CID), and the like. These cell identifiers may be used in combination with other identifiers, such as the Mobile Country Code MCC, Mobile Network Code MNC, Location Area Code LAC, Location Area Identity LAI, and the like. Moreover, global base station identifiers such as the Base Station Identification Code (BSIC), Cell Global Identity (CGI), and the like may be used in the methods described in this application, in place of (or as well as) the cell identifiers. Moreover, in future iterations of the telecommunications standards, different conventions for identifying cells may be used. Such cell identifiers may be utilised in methods described in the present application.

Whilst LTE (4G) and NR (5G) applications are described in specific examples above, these techniques could be used for 2G/3G/4G/5G and beyond. Moreover, WiFi signals could also be used in a similar manner to support location estimation techniques.

Although particular embodiments of the invention have been described, the skilled person will appreciate that various modifications and variations may be made without departing from the scope of the invention.

The invention claimed is:

1. A method of estimating a geographic location of a mobile device configured to communicate using a telecommunications network comprising a plurality of cells, the method comprising:

obtaining one or more data records from the mobile device, wherein each data record comprises a plurality of signal measurements and respective cell identifiers, wherein each signal measurement relates to a signal received by the mobile device from a cell of the plurality of cells attributed with the respective cell identifier;

for each data record, generating an ordered list of signal properties comprising the plurality of signal measurements, wherein each signal property in the ordered list of signal properties is correlated with a corresponding cell identifier assigned to the cell from which the signal was received, based on an index of the signal property in the ordered list of signal properties; and for each data record, estimating the geographic location of the mobile device based on the ordered list of signal properties.

2. The method of claim 1, wherein the one or more data records comprise a first data record corresponding to a first time and a second data record corresponding to a second time different to the first time, wherein each data record further comprises an identifier linked to the mobile device, wherein the method further comprises:

using the identifiers from the first and second data records to determine that the first and second data records have been obtained from the same mobile device.

3. The method of claim 2, wherein for the second data record, estimating the geographic location of the mobile device comprises estimating the geographic location of the mobile device based on the ordered list of signal properties and the estimated geographic location of the mobile device for the first data record.

4. A mobile equipment comprising:

a processor; and a computer memory, wherein the computer memory comprises instructions that, when executed on the processor, case the mobile equipment to perform the method of claim 1, wherein the mobile equipment further comprises the mobile device from which the one or more data records are obtained.

5. A method of providing training data to a model for estimating a geographic location of a mobile device based on a plurality of signal measurements, the method comprising:

obtaining one or more data records from a mobile device, wherein each data record comprises:

a plurality of signal measurements and respective cell identifiers, and a corresponding measurement of the geographic location of the mobile device, wherein the mobile device is configured to communicate using a telecommunications network comprising a plurality of cells, wherein each signal measurement relates to a signal received by the mobile device from a cell of the plurality of cells attributed with the respective cell identifier;

for each data record, generating an ordered list of signal properties comprising the plurality of signal measurements, wherein an index of each signal property in the ordered list of signal properties is correlated with a corresponding cell identifier assigned to the cell from which the signal was received, based on an index of the signal property in the ordered list of signal properties; and for each data record, providing the ordered list of signal properties and the corresponding measurement of the geographic location of the mobile device to the model.

6. The method of claim 5, wherein the mobile device is a first mobile device, wherein the ordered list is a first ordered list, wherein the model is configured to receive as an input an ordered list of signal properties obtained from a second mobile device configured to communicate using the telecommunications network, wherein an index of each signal property in the ordered list of signal properties from the second device is correlated with a corresponding cell identifier assigned to the cell from which the signal was received, based on an index of the signal property in the ordered list of signal properties, and wherein the model is configured to provide as an output an estimation of a geographic location of the second mobile device.

7. The method of claim 5, wherein generating the ordered list of signal properties comprises, for each signal property in the ordered list having an index corresponding to a cell identifier for which a respective signal measurement has not been obtained, assigning a value to the signal property in the ordered list indicating that no signal has been received by the mobile device.

8. The method of claim 5, wherein the mobile device is:

a user equipment;

an aerial vehicle;

an unmanned aerial vehicle, UAV;

a user equipment aboard a manned or unmanned aerial vehicle; or an airborne device.

9. The method of claim 8, wherein each data record further comprises an altitude measurement of the mobile device, wherein the model is configured for use with signal measurements relating to a predetermined range of altitudes and wherein the altitude measurement of the mobile device lies within the predetermined range of altitude measurements.

10. The method of claim 5, wherein the plurality of signal measurements comprises:

one or more signal strength measurements;

one or more RSSI measurements;

one or more RSRP measurements;

one or more signal quality measurements one or more RSRQ measurements; and/or one or more location measurements.

11. The method of claim 5, wherein the method further comprises:

receiving at the mobile device a plurality of signals from a subset of the plurality of cells, each signal comprising encoded data, wherein the encoded data comprises a cell identifier attributed to the cell from which the signal was received;

for each of the plurality of received signals, determining one or more signal measurements;

for each of the plurality of received signals, decoding the signal and determining the cell identifier encoded within the signal; and communicating a data record comprising the signal measurements and respective cell identifiers to a cell of the plurality of cells.

12. A mobile equipment comprising:

a processor; and a computer memory, wherein the computer memory comprises instructions that, when executed on the processor, case the mobile equipment to perform the method of claim 5, wherein the mobile equipment further comprises the mobile device from which the one or more data records are obtained.

13. A method of correlating each signal property in an ordered list of signal properties to a corresponding cell identifier based on an index of the signal property in the ordered list of signal properties, wherein the ordered list of signal properties is suitable for input to a model for estimating a geographic location of a mobile device, the method comprising:

reading one or more data records, wherein each data record comprises a plurality of signal data entries, wherein each signal data entry corresponds to a signal received by a mobile device and wherein each signal data entry comprises:

a signal measurement of the signal, and a respective cell identifier assigned to a cell from which the signal was received;

for each data record of the one or more data records and for each signal data entry of the plurality of signal data entries in the data record, reading the cell identifier of the signal data entry; and for each unique cell identifier read from the plurality of signal data entries and from the one or more data records, correlating a signal property in an ordered list of signal properties with the corresponding unique cell identifier, based on an index of the signal property in the ordered list of signal properties.

14. A mobile equipment comprising:

a processor; and a computer memory, wherein the computer memory comprises instructions that, when executed on the processor, case the mobile equipment to perform the method of claim 13, wherein the mobile equipment further comprises the mobile device from which the one or more data records are obtained.

15. A method of generating an ordered list of signal properties, the method comprising:

reading a data record comprising a plurality of signal data entries, wherein each signal data entry corresponds to a signal received by a mobile device and wherein each signal data entry comprises:

a received signal measurement of the signal, and a respective cell identifier assigned to a cell from which the signal was received;

for each signal data entry of the plurality of signal data entries in the data record, populating a signal property in the ordered list of signal properties with the signal measurement of the signal data entry, wherein the updated signal property is correlated to the corresponding cell identifier of the signal data entry, based on an index of the signal property in the ordered list of signal properties.

16. The method of claim 15, further comprising initialising each signal property in the ordered list with a value indicating that no signal has been received.

17. The method of claim 15, wherein each cell identifier is:

a Physical Cell ID, PCI; and/or

Cell Global Identity, CGI.

* * * * *